s
3,110,563
PROCESS FOR THE PRODUCTION OF HIGH
PERCENTAGE NITRIC OXIDE
Kurt Krauss and Heinrich Diekmann, Ludwigshafen
(Rhine), Germany, assignors to Badische Anilin- &
Soda-Fabrik Aktiengesellschaft, Ludwigshafen am
Rhine, Germany
No Drawing. Filed Mar. 31, 1959, Ser. No. 803,093
Claims priority, application Germany Apr. 10, 1958
6 Claims. (Cl. 23—162)

This invention relates to a process for the production of high percentage nitric oxide (NO) gas by combustion of ammonia with oxygen while using platinum metal catalysts.

This process is not to be confused with the process, known for a long time, of the combustion of ammonia with air or oxygen for the purpose of obtaining nitric acid, according to which stress is laid on the most complete combustion of the ammonia possible and the recovery of oxides of nitrogen, such as NO, $N_2O_3$, $NO_2$, $N_2O_4$ and $N_2O_5$, which can be converted with water and oxygen into nitric acid. The process for the production of high percentage nitric oxide differs from the above-mentioned process in that all the oxides of nitrogen, except nitric oxide, are undesirable byproducts of which the formation must be prevented as far as possible.

Nitric oxide, which has hitherto not been manufactured industrially on a large scale, has recently gained increased importance as an initial material for the production of nitrogenous compounds, for example hydroxylamine.

It has long been known to burn ammonia with oxygen with the addition of steam and with the aid of catalysts to form oxides of nitrogen, the steam serving to prevent an explosion of the mixture of ammonia and oxygen. Methods have also been described in which the explosibility of the mixture is precluded by cooling the catalyst or by other precautions concerning the catalyst. These methods are used for the production of oxides of nitrogen which are to be worked up into nitric acid.

In order to achieve good combustion yields at the catalyst, a volumetric ratio of $NH_3:O_2$ of 1.0:1.5 to 2.0 is maintained in the mixture to be supplied to the combustion in all the said methods. According to the reaction equation:

$$4NH_3 + 5O_2 = 4NO + 6H_2O$$

a ratio of 1.0:1.25 would be theoretically sufficient in order to obtain the NO which forms preferentially. In the combustion of ammonia with air in practice it has been found however that a mixture with the ratio $NH_3:O_2=1$:less than 1.54, which corresponds to an ammonia content of more than 12% in the air, can be burnt only with unsatisfactory yields at a platinum-rhodium catalyst, whereas with ammonia contents of up to 12%, combustion yields of about 98% of the ammonia used are achieved. For example the combustion yield with an ammonia content of 14% is only about 85%.

In so far as the oxidation of ammonia has been carried out with oxygen instead of with air and indeed with the addition of steam, with the object of obtaining nitric acid, volumetric ratios of $NH_3:O_2=1.0$:at least 1.5 have also been used.

We have now found, surprisingly, that the catalytic combustion of ammonia with oxygen with the addition of a protective gas, such as carbon dioxide or especially, steam, can also be carried out with a considerably smaller excess of oxygen without substantially diminished combustion yields having to be tolerated, and that a high percentage nitric oxide gas is thereby formed. According to this invention a mixture of 1 part by volume of ammonia with 1.28 to 1.40, especially 1.33 to 1.35, parts by volume of oxygen is subjected to oxidation at a platinum metal catalyst in the presence of a protective gas. The oxidation is carried out at a temperature between 750 and 1,000° C., preferably between 850 and 900° C. Below 750° C. the yield of nitric oxide drops sharply, while above 1,000° C. there is too much loss of vaporizing catalyst metal. The catalyst which we apply in the process according to our invention is a catalyst containing platinum metal. The preferred type of catalyst is a platinum-rhodium alloy. Optimum results are obtained by using a platinum catalyst containing 3 to 10% of rhodium. The proportions may however be varied within wide limits and we do not want to be restricted to the said range. Pure platinum or alloys of platinum and other metals can also be used.

Examples a, b and c show that the yields of nitric oxide are poor when the ratio of ammonia to oxygen is 1:1.5 and 1:1.25. We prefer to work within the range of 1:1.28 to 1:1.40, where good yields are obtained. Optimum yields are obtained at a ratio of ammonia to oxygen of 1:1.33 to 1.35. It is thus possible to recover by far the major part, namely more than 80% of the ammonia-nitrogen used, in the form of highly concentrated nitric oxide gas, whereas according to the processes hitherto used for nitric acid production, nitrogen dioxide is obtained as the main product.

The working up of the reaction gas is advantageously effected by separating the steam as dilute nitric acid by condensation and washing the reaction gas which has been freed from the steam with the dilute nitric acid thus obtained, and then treating the gas with alkaline reagents. A gas containing at least 95% of NO is thus obtained.

The following example will further illustrate this invention but the invention is not restricted to this example.

*Example*

(a) 14 parts by volume of ammonia, 18.6 parts of oxygen and 67.4 parts of steam are mixed. The volumetric ratio of ammonia:oxygen is 1:1.33. The mixture is introduced at a temperature of 100° to 200° C. into a reactor in which the formation of nitric oxide takes place at a platinum-rhodium catalyst at 850° to 900° C. The hot reaction gas is led into a waste heat boiler in which the gas is cooled with the formation of steam. By further cooling of the reaction gas in a tubular condenser, the steam contained therein is condensed and a 6% nitric acid is formed by partial absorption of the nitrogen dioxide. This acid serves as washing liquid in a washing tower through which the reaction gas then passes and in which the concentration of nitric acid rises to 7.5%. The remainder of the nitrogen dioxide is washed out from the gas in a second washing tower by means of an alkaline reagent, for example a 10% sodium hydroxide solution, or a solution of sodium carbonate or sodium acetate, sodium nitrite thereby being formed. Instead of the solutions it is also possible to use the solid substances and to treat the reaction gas with a solid substance of the said type. The gas may also be treated with the said alkaline reagents without its previously being washed with dilute nitric acid. However, the amount of alkaline reagent required is larger in this case than after a washing with dilute nitric acid. The gas, after the second washing, consists to the extent of 95 to 96% of nitric oxide. The impurities in the nitric oxide are nitrogen and nitrous oxide ($N_2O$).

The yields, with reference to the nitrogen introduced into the reactor in the form of ammonia, are 82% of nitric oxide, 15% of nitric acid and 1% of sodium nitrite, a total of 98%. The remainder is present as elementary nitrogen and nitrous oxide.

(b) If the ratio of ammonia:oxygen is changed to 1:1.5, the following yields are obtained under otherwise identical conditions: 70% of nitric oxide, 26% of nitric acid and 2% of sodium nitrite, a total of 98%.

(c) If the ratio of ammonia:oxygen is changed to 1:1.25 (the theoretical value), the following yields are obtained under otherwise identical conditions: 75% of nitric oxide, 5% of nitric acid and 0.5% of sodium nitrite, a total of 80.5%.

We claim:

1. A process for the production of high percentage nitric oxide which comprises subjecting a mixture of 1 part by volume of ammonia to an oxidizing treatment with 1.33 to 1.35 parts by volume of oxygen on a catalyst consisting essentially of platinum alloyed with 3 to 10 percent by weight of rhodium, at a temperature between 850 and 900° C. in the presence of steam, separating the steam from the reaction gas as dilute nitric acid by condensation, washing the reaction gas with said dilute nitric acid, and treating the washed gas with an alkaline reagent.

2. A process for production of high percentage nitric oxide which comprises reacting a mixture of oxygen and ammonia at a volume ratio of 1.28–1.40:1, respectively, on a platinum catalyst at a temperature between 750° C. and 1000° C. in the presence of steam to form oxides of nitrogen consisting mainly of nitric oxide, condensing the steam in the reaction mixture and forming dilute nitric acid solution by absorption in said condensate of nitrogen dioxide formed during said reaction, and washing the reaction gas with said dilute nitric acid solution to remove by absorption further amounts of nitrogen dioxide.

3. A process as claimed in claim 2 wherein the washed reaction gas is further washed with a solution of an alkaline reagent.

4. A process as claimed in claim 2 wherein said platinum catalyst is an alloy of platinum and 3–10% by weight, based on the platinum, of rhodium.

5. A process as claimed in claim 2 wherein said volume ratio is 1.33–1.35:1, respectively.

6. A process for production of high percentage nitric oxide which comprises reacting a mixture of oxygen and ammonia at a volume ratio of 1.28–1.35:1, respectively, on a platinum catalyst at a temperature between 750° C. and 1000° C. in the presence of steam to form oxides of nitrogen consisting mainly of nitric oxide, and recovering the formed nitric oxide from the reaction mixture.

References Cited in the file of this patent

UNITED STATES PATENTS

| | | |
|---|---|---|
| 1,949,462 | Fogler | Mar. 6, 1934 |
| 1,989,267 | Caro | Jan. 29, 1935 |
| 2,004,141 | Tilley et al. | June 11, 1935 |
| 2,697,652 | Ribble | Dec. 21, 1954 |

FOREIGN PATENTS

| | | |
|---|---|---|
| 276,295 | Great Britain | Oct. 13, 1927 |

OTHER REFERENCES

Maddock et al.: "Recent Aspects of the Inorganic Chemistry of Nitrogen," The Chemical Society, Burlington House, London, Special Publication No. 10, 1957, pp. 61–63.

Mellor: "Comprehensive Treatise on Inorganic and Theoretical Chemistry," Longmans, Green, and Co., 1928, vol. 8, pp. 539–540.

Partington: "The Nitrogen Industry," 1922, Constable & Co., Ltd., London, pp. 282–298.